US010659499B2

(12) United States Patent
Davies

(10) Patent No.: US 10,659,499 B2
(45) Date of Patent: May 19, 2020

(54) PROVIDING SELECTABLE CONTENT ITEMS IN COMMUNICATIONS

(71) Applicant: Google LLC, Mountain View, CA (US)

(72) Inventor: Benedict John Davies, London (GB)

(73) Assignee: Google LLC, Mountain View, CA (US)

(*) Notice: Subject to any disclaimer, the term of this patent is extended or adjusted under 35 U.S.C. 154(b) by 161 days.

(21) Appl. No.: 15/693,314

(22) Filed: Aug. 31, 2017

(65) Prior Publication Data

US 2018/0013799 A1 Jan. 11, 2018

Related U.S. Application Data

(63) Continuation of application No. 14/250,222, filed on Apr. 10, 2014, now Pat. No. 9,756,091.

(60) Provisional application No. 61/968,723, filed on Mar. 21, 2014.

(51) Int. Cl.
G06F 3/00 (2006.01)
H04L 29/06 (2006.01)

(52) U.S. Cl.
CPC ...... H04L 65/4015 (2013.01); H04L 65/1089 (2013.01); H04L 65/403 (2013.01)

(58) Field of Classification Search
CPC combination set(s) only.
See application file for complete search history.

(56) References Cited

U.S. PATENT DOCUMENTS

| | | | |
|---|---|---|---|
| 7,707,226 B1 | 4/2010 | Tonse | |
| 7,761,507 B2 | 7/2010 | Herf et al. | |
| 7,783,980 B1 | 8/2010 | Herold | |
| 7,986,917 B2 | 7/2011 | Ahlgren et al. | |
| 8,341,174 B2 | 12/2012 | Hjelm et al. | |
| 8,510,653 B2 | 8/2013 | Sinn et al. | |
| 9,076,154 B1 | 7/2015 | Song et al. | |
| 2003/0028390 A1 | 2/2003 | Stern et al. | |
| 2004/0075686 A1 | 4/2004 | Watler et al. | |
| 2004/0220925 A1 | 11/2004 | Liu et al. | |
| 2005/0060365 A1 | 3/2005 | Robinson et al. | |
| 2008/0071739 A1 | 3/2008 | Kumar et al. | |
| 2008/0086356 A1 | 4/2008 | Glassman et al. | |
| 2008/0133501 A1 | 6/2008 | Andersen et al. | |

(Continued)

OTHER PUBLICATIONS

USPTO, Notice of Allowance for U.S. Appl. No. 14/250,222, dated May 10, 2017, 17 pages.

(Continued)

Primary Examiner — Hien L Duong
(74) Attorney, Agent, or Firm — Fish & Richardson P.C.

(57) ABSTRACT

Implementations relate to providing selectable content items in communications. In some implementations, a method includes determining that a user is or will be participating in a communication using a device, the communication including an exchange of information with one or more other users. The method determines a set of one or more content items to be presented on the device for selection by the user, the content items derived from stored content and being related to activity performed by the user using the device or one or more other devices, and where the activity is external to the communication. The method causes a presentation of the set of content items with the device for selection by the user, and causes at least one content item selected by the user to be sent in the communication to at least one of the other users.

20 Claims, 7 Drawing Sheets

(56) References Cited

U.S. PATENT DOCUMENTS

| | | |
|---|---|---|
| 2008/0195945 A1 | 8/2008 | Vaughan et al. |
| 2008/0222246 A1 | 9/2008 | Ebling et al. |
| 2009/0138495 A1 | 5/2009 | Kalaboukis et al. |
| 2009/0222742 A1 | 9/2009 | Pelton et al. |
| 2009/0239552 A1 | 9/2009 | Churchill et al. |
| 2009/0254840 A1 | 10/2009 | Churchill et al. |
| 2009/0319569 A1 | 12/2009 | Parks |
| 2010/0036929 A1 | 2/2010 | Scherpa et al. |
| 2010/0042469 A1 | 2/2010 | Chandrasekar et al. |
| 2010/0082398 A1 | 4/2010 | Davis et al. |
| 2010/0145976 A1 | 6/2010 | Higgins et al. |
| 2010/0241663 A1 | 9/2010 | Huang et al. |
| 2011/0010641 A1 | 1/2011 | Wolff et al. |
| 2011/0022967 A1 | 1/2011 | Vijayakumar et al. |
| 2011/0055295 A1 | 3/2011 | Bhide et al. |
| 2011/0066619 A1 | 3/2011 | Perantatos et al. |
| 2011/0173570 A1 | 7/2011 | Moromisato et al. |
| 2011/0202854 A1 | 8/2011 | Chan et al. |
| 2011/0213655 A1 | 9/2011 | Henkin et al. |
| 2011/0252366 A1 | 10/2011 | Balasubramanian et al. |
| 2011/0270923 A1 | 11/2011 | Jones et al. |
| 2011/0271205 A1 | 11/2011 | Jones et al. |
| 2011/0271206 A1 | 11/2011 | Jones et al. |
| 2011/0271207 A1 | 11/2011 | Jones et al. |
| 2011/0271208 A1 | 11/2011 | Jones et al. |
| 2011/0271210 A1 | 11/2011 | Jones et al. |
| 2011/0302247 A1 | 12/2011 | Narayanan et al. |
| 2012/0030289 A1 | 2/2012 | Buford et al. |
| 2012/0036452 A1 | 2/2012 | Coleman et al. |
| 2012/0059842 A1 | 3/2012 | Hille-doering et al. |
| 2012/0102409 A1 | 4/2012 | Fan et al. |
| 2012/0198328 A1 | 8/2012 | Kiley et al. |
| 2012/0246240 A1 | 9/2012 | Hanlon |
| 2012/0265808 A1 | 10/2012 | Ezell et al. |
| 2012/0271719 A1 | 10/2012 | Straley et al. |
| 2012/0290974 A1 | 11/2012 | Doig et al. |
| 2012/0303710 A1 | 11/2012 | Roberts et al. |
| 2012/0304076 A1 | 11/2012 | Gutcher |
| 2012/0304079 A1 | 11/2012 | Rideout et al. |
| 2013/0067384 A1 | 3/2013 | Bier |
| 2013/0073965 A1 | 3/2013 | Sik et al. |
| 2013/0132566 A1 | 5/2013 | Olsen et al. |
| 2013/0145282 A1 | 6/2013 | Zhao |
| 2013/0212488 A1 | 8/2013 | Scherpa |
| 2013/0254232 A1* | 9/2013 | Reimer .............. G06F 16/435 707/772 |
| 2013/0254651 A1 | 9/2013 | Lee |
| 2013/0275353 A1 | 10/2013 | Ingrassia, Jr. et al. |
| 2013/0298030 A1 | 11/2013 | Nahumi et al. |
| 2013/0307997 A1 | 11/2013 | O'Keefe et al. |
| 2014/0033049 A1 | 1/2014 | Fitzpatrick |
| 2014/0130182 A1 | 5/2014 | Yackanich et al. |
| 2014/0164507 A1 | 6/2014 | Tesch et al. |
| 2014/0181123 A1* | 6/2014 | Tuffet Blaise .......... G06F 16/48 707/749 |
| 2014/0222831 A1 | 8/2014 | Ramkumar et al. |
| 2014/0270683 A1 | 9/2014 | Zhu et al. |
| 2015/0031396 A1* | 1/2015 | Hartford ................ H04W 4/02 455/456.3 |
| 2015/0095329 A1 | 4/2015 | Sanio et al. |
| 2015/0095874 A1 | 4/2015 | Tapaninen |
| 2015/0178388 A1 | 6/2015 | Winnemoeller et al. |
| 2015/0199429 A1* | 7/2015 | Kritt ..................... G06F 16/29 707/776 |
| 2015/0242706 A1* | 8/2015 | Brown .................. G06F 16/51 382/224 |
| 2015/0331553 A1 | 11/2015 | Shaffer |

OTHER PUBLICATIONS

USPTO, First Action Interview Office Action for U.S. Appl. No. 14/250,222, dated Mar. 10, 2016, 21 pages.

USPTO, Non-final Office Action for U.S. Appl. No. 14/250,222, dated Dec. 21, 2016, 22 pages.

USPTO, Final Office Action for U.S. Appl. No. 14/250,222, dated Aug. 31, 2016, 23 pages.

USPTO, First Action Interview, Pre-Interview Communication for U.S. Appl. No. 14/250,222, dated Nov. 4, 2015, 5 pages.

* cited by examiner

PROVIDING SELECTABLE CONTENT ITEMS IN COMMUNICATIONS

CROSS REFERENCE TO RELATED APPLICATIONS

This application is a continuation of U.S. patent application Ser. No. 14/250,222, titled PROVIDING SELECTABLE CONTENT ITEMS IN COMMUNICATIONS, filed Apr. 10, 2014, which claims priority from U.S. Provisional Patent Application No. 61/968,723, titled PROVIDING SELECTABLE CONTENT ITEMS IN COMMUNICATIONS, filed Mar. 21, 2014, both of which are hereby incorporated by reference as if set forth in full in this application for all purposes.

BACKGROUND

Users can engage in a variety of types of communications to converse with friends, meet or talk with fellow employees, or otherwise exchange information with other users. For example, in addition to the standard telephone calls, users can participate in video conferencing using device such as desktop computers or portable devices such as laptop computers, cell phones, tablet computers, and wearable devices. Users can also communicate in real time with others using text chat or messaging applications, in which users exchange text messages with each other using a variety of devices. In some forms of communication, users can send other types of content in addition to the primary mode of communication. For example, in a text chat, users can send graphical icons such as emoticons to express thoughts, feelings, and ideas.

SUMMARY

Implementations of the present application relate to providing selectable content items in communications. In some implementations, a method includes determining that a user is or will be participating in a communication using a device, the communication including an exchange of information with one or more other users. The method determines a set of one or more content items to be presented on the device for selection by the user, where the content items in the set are derived from stored content and are related to activity performed by the user using the device or one or more other devices, and where the activity is external to the communication. The method causes a presentation of the set of content items with the device for selection by the user, and causes at least one content item selected by the user to be sent in the communication to at least one of the other users.

Various implementations and examples of the method are described. For example, the communication can be a real-time communication that is a real-time exchange of information with one or more other users using a device. The method can further include creating and storing at least one of the content items derived from the stored content. At least one of the content items can be an extracted portion of a work of content included in the stored content. For example, a content item can be an excerpt from a work of video content, audio content, or game content, where the excerpt is an image or is video or audio data that is less than a minute in played duration, for example. Determining the set of content items can include, for each of the content items, evaluating engagement of the user with at least a portion of the stored content during the activity, where the portion of content is associated with the content item. For example, evaluating engagement of the user can include examining the user's actions during the experience of the content, where the user's actions include actions indicating engagement and actions indicating disengagement relative to the content. Determining the set of content items can include detecting one or more highlight events during the activity that are determined to be likely to be discussed in real-time communications involving the user. Determining the set of content items can include dynamically obtaining at least one of the content items in the set based on the content item being related to information contributed by any user participating in the communication.

The activity can include a previous activity of the user occurring within a predetermined time period before the real-time communication. The activity can involve a work of content that is related to one or more of the content items, where the user performing the activity causes the device to obtain at least one of the content items related to the work of content. For example, the activity with the device or one or more other devices can include playing audio with the device, where the audio is based on audio content of the stored content; displaying video data or image data with the device based on video or image content of the stored content; playing a game using the device, the game based on game content of the stored content; interacting with an application program using the device, the application program based on application content of the stored content; and/or displaying text data from a textual work displayed on the device, where the text data is based on textual content of the stored content. The activity can include visiting a geographic location while carrying or wearing the device; using a mode of transport while carrying or wearing the device; accessing one or more websites or webpages over a network using the device; and/or performing a physical activity while carrying or wearing the device.

The content items can include a portion of video content of the stored content, a portion of audio content of the stored content, data related to a game or application program of the stored content, data related to a book, magazine, or other text work of the stored content, data related to a geographic location, and/or map data related to a portion of the stored content. The content items can be presented in multiple categories that are based on preferences of the user.

A method includes, in some implementations, detecting that a user has experienced stored content using a device and determining that the user is or will be using the device to participate in a real-time communication that is a real-time exchange of information with one or more other users. The method determines a set of one or more content items for selection by the user, where the content items in the set are dynamically derived from the stored content which the user has experienced as detected by the device. Determining the set of content items includes evaluating an engagement of the user with an associated portion of the stored content during the experience of the content. The set of content items are presented with the device for selection by the user. A selection is received from the user of at least one of the content items, and the selected content item(s) are provided for transmission to at least one of the other users during the real-time communication.

In some implementations, a system can include a storage device and at least one processor accessing the storage device and operative to perform operations. The operations include determining that a user is or will be participating in a communication using a device, the communication including an exchange of information with one or more other users. The operations include determining a set of one or more content items to be presented on the device for selection by the user, where the content items in the set are derived from stored content and are related to activity performed by the user using the device or one or more other devices, and where the activity is external to the communication. The operations cause a presentation of the set of content items with the device for selection by the user, and cause at least one content item selected by the user to be sent in the communication to at least one of the other users.

In various implementations of the system, the operation of determining the set of one or more content items can include, for each of the content items, evaluating engagement of the user with at least a portion of the stored content during the activity, the portion being associated with the content item. The operation of determining the set of content items can include dynamically obtaining at least one of the content items in the set based on the content item being related to information contributed by any user participating in the communication. The activity can involve a work of content that is related to one or more of the content items, where the user performing the activity causes the device or one or more other devices to obtain at least one of the content items related to the work of content.

DETAILED DESCRIPTION

Figure 1:
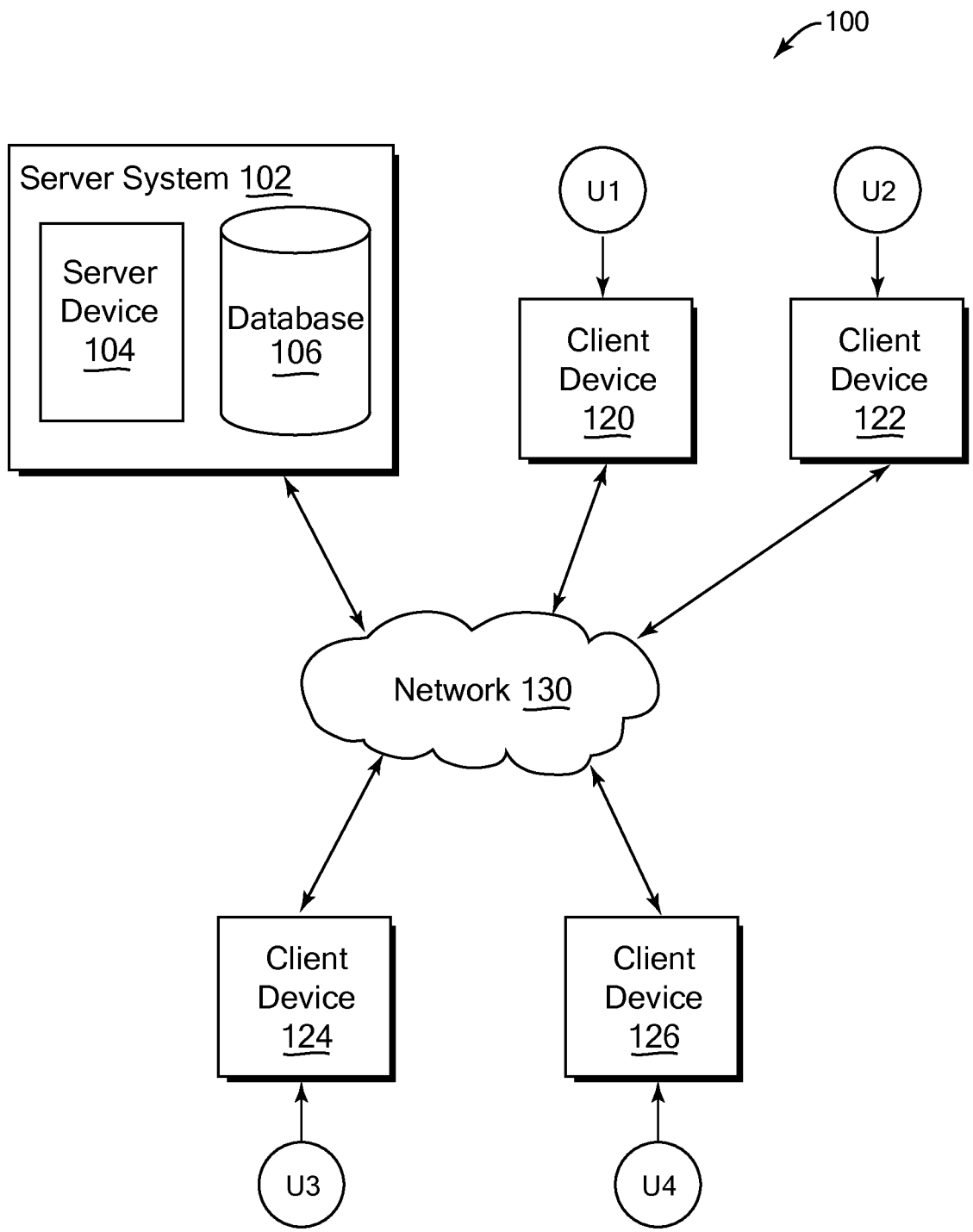
FIG. 1 is a block diagram of an example network environment which may be used for one or more implementations described herein.

One or more implementations described herein relate to providing selectable content items in communications. Presented content items are selectable by a user to be included in the communication. In some examples, creative content items such as video clips, audio clips, images, maps, portions of text, and other content items that are extracted from or related to stored content can be presented to a user and included in a user's real-time communications with other users. The presented content items are based on current or recent activity of the user with the device.

Described features provide automatic quick and easy selections of dynamic shareable content items to a user that are highly relevant to recent user activities with a device and relevant to subjects of conversation. For example, the varied content items provide a user with a selection of content that can convey relevant topics, subjects, ideas, and feelings for the user to use in a communication with one or more other users. These content items can be created and presented automatically before or during a communication, without the user having to create, store, and/or have content items ready and waiting for a communication, and without the user having to know how to create such content items. The user can use the content items to embellish conversations and discussions creatively and with relevance to the user's notable experiences and/or relevance to current topics of conversation. Such features can allow much greater individuality, creativity, and personal expression in communications with other users than fixed lists of icons or other items in previous communication products. Thus, a technical effect of providing content items as disclosed herein include a reduction in user time searching for and/or creating such items, thus saving a user time, energy, and resources for providing a larger variety of content items to use in communications. Another technical effect is a higher quality in conversation resulting from a larger and more varied amount of appropriate and dynamic content items being available and shareable immediately in fast-moving communications.

In some example implementations, a device can create and store content items derived from stored content. For example, the device can detect that a user is experiencing content using the device, and the device can obtain content items derived from that content, such as by creating content items and/or retrieving previously-created content items. Content items can be portions of the content, e.g., created by extracting portions or frames from video content (e.g., to create an animated GIF), cutting a portion of audio content, extracting or retrieving images from content, extracting a portion of text content, extracting images from a recording of game play, etc. Content items can also be different in type but related to content. For example, album cover images and videos of a band can be related to audio (music) content; a screenshot image of a high score can be related to game content; a front cover or back photo of a book can be related to text content; or photos or a map of a location can be related to content describing a geographic location. The user can also manually create content items from (or related to) content. Content items that were created by other users or devices may also be accessible and retrieved for use by the device. The device can also categorize created and obtained content items according to user preferences, current or recent events, etc.

The user participates in a communication with one or more other users using the device, such as a real-time communication, e.g., text messaging or text chat, an audio telephone call, a video chat or teleconference, etc. The device can determine a set of content items for the user, e.g., from a larger pool of available content items, and can present the set of content items for selection by the user before and/or during the communication. Content item(s) selected by the user are sent to other user(s) in the communication, e.g., inserted in a text message, displayed on a video chat screen, etc. The content items included in the presented set are related to activity performed by the user using the device (or using other devices) and thus can be personal to the user. For example, content items in the set can be derived from content which the user experienced previously or currently, as detected by the device. In some examples, if the user viewed a video, movie or TV program, played (or is playing) a music track, read a book, and played a game on the device, content items extracted from or related to these content can be included in the presented set of content items. Content items can also be derived from such activities as visiting geographical locations or performing physical activity while carrying the device (e.g., to obtain content items that are pictures of visited locations or related to the physical activity). Thus, the user activity can be unrelated to communicating with other users using the device.

Some implementations only present content items that are related to recent activities of the user, e.g., within a predetermined time period. In some implementations, content items can be chosen to be in the set if those items are related to one or more contributions of information by users in the communication. For example, if a user mentions a movie title in a chat, and a content item is available that is related to that movie (such as a video or audio clip), then that content item can be included in the presented set of content items. Some implementations can choose to present (or assign greater weight/rank/priority to) content items that are related to a greater engagement of the user with the associated content during the activity as detected by the device based on various signals. For example, if a user replayed a movie scene several times, a content item derived from that replayed scene can have more priority than scenes played once by the user. Or, a user listening to a music track played on the carried device while performing physical activity (such as jogging as detected by device sensors) is estimated to be more disengaged with that music, and content items from that music track can be given less priority or rank than a music track the user listened to while sitting still. The method can use combinations of (e.g., simultaneous) user activities to create multi-faceted content items.

FIG. 1 illustrates a block diagram of an example network environment 100, which may be used in some implementations described herein. In some implementations, network environment 100 includes one or more server systems, such as server system 102 in the example of FIG. 1. Server system 102 can communicate with a network 130, for example. Server system 102 can include a server device 104 and a database 106 or other storage device. Network environment 100 also can include one or more client devices, such as client devices 120, 122, 124, and 126, which may communicate with each other via network 130 and/or server system 102. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, such as a computer system, laptop computer, portable device, cell phone, smart phone, tablet computer, television, TV set top box or entertainment device, wearable devices (e.g., display glasses or goggles, wristwatch, etc.), personal digital assistant (PDA), media player, game device, etc. In other implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1-U4 may interact with each other via a social network service implemented on server system 102, where respective client devices 120, 122, 124, and 126 transmit communications and data to one or more server systems such as system 102, and the server system 102 provides appropriate data to the client devices such that each client device can receive content uploaded to the social network service via the server system 102. In some examples, the social network service can include any system allowing users to perform a variety of communications, form links and associations, upload and post shared content including text, images, video sequences, audio sequences or recordings, or other types of content for access by designated sets of users of the social network service, and/or perform other socially-related functions.

A user interface can enable display of images and other content as well as communications, privacy settings, notifications, and other data on a client device 120, 122, 124, and 126. Such an interface can be displayed using software on the client device, such as application software or client software in communication with the server system. The interface can be displayed on an output device of a client device, such as a display screen.

Other implementations of features described herein can use any type of system and service. For example, any type of electronic device can make use of features described herein. Some implementations can process one or more features on client or server systems disconnected from or intermittently connected to other devices or computer networks, and features can then be provided to connected devices. In some examples, a client device having a display screen can display images and provide features and results as described herein that are viewable to a user.

Figure 2:
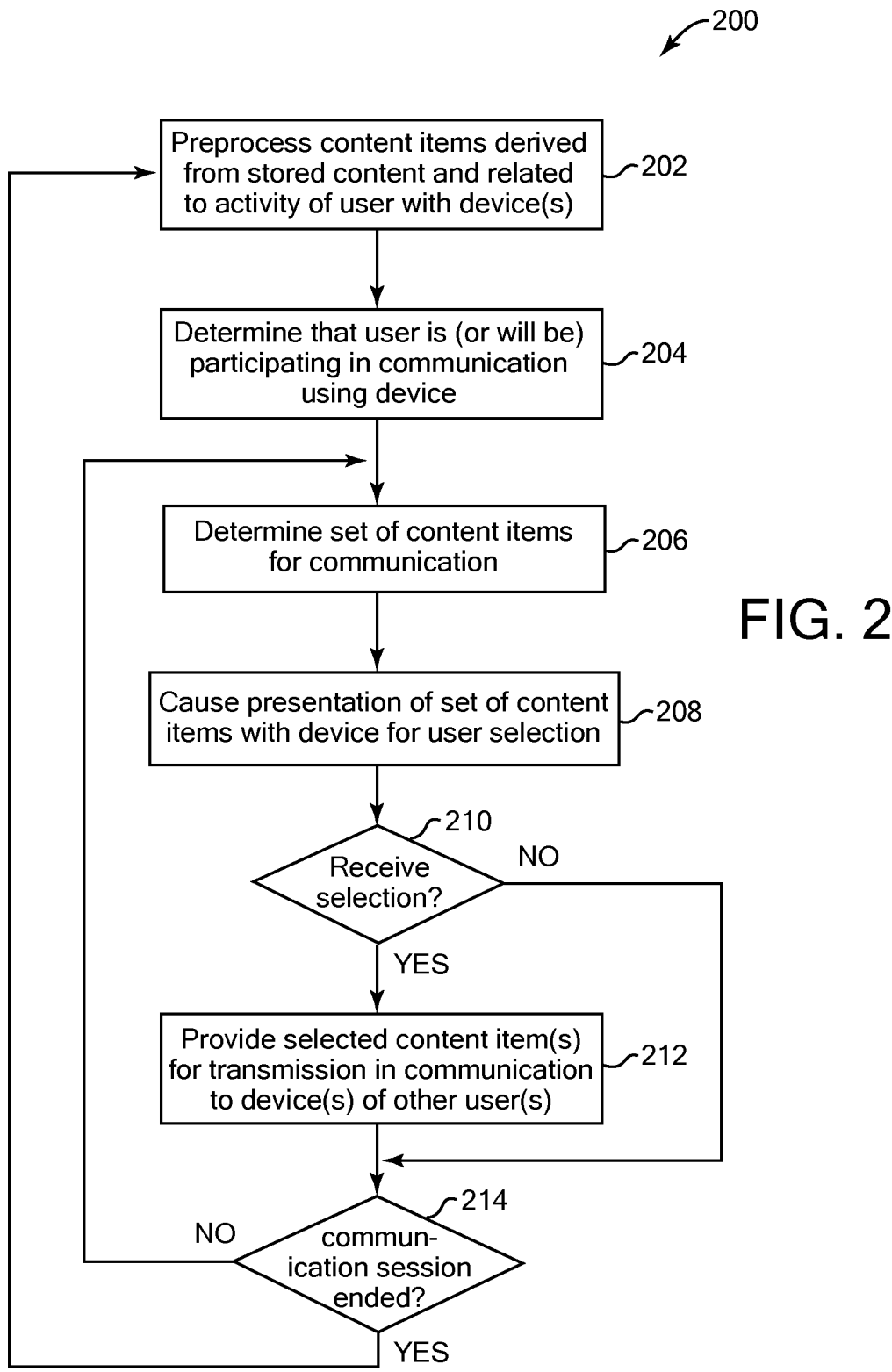
FIG. 2 is a flow diagram illustrating an example method for providing selectable content items in communications, according to some implementations.

FIG. 2 is a flow diagram illustrating one example of a method 200 for providing selectable content items in communications. In some implementations, method 200 can be implemented, for example, on a client device 120, 122, 124, or 126 as shown in FIG. 1. In other implementations, some or all of the method 200 can be implemented on a system such as server system 102, and/or on both a server system and a client system. In described examples, the implementing system includes one or more processors or processing circuitry, and one or more storage devices such as memory, a database 106, and/or other storage. In some implementations, different components of one or more servers and/or clients can perform different blocks or other parts of the method 200.

Method 200 can be implemented by computer program instructions or code, which can be executed on a computer, e.g., implemented by one or more processors, such as microprocessors or other processing circuitry and can be stored on a computer program product including a computer readable medium, such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, method 200 can be implemented in hardware (logic gates, etc.), or in a combination of hardware and software.

In some implementations, method 200, or portions of the method, can be initiated based on user input. A user may, for example, have selected the initiation of the method 200 from an interface such as an application interface, a social networking interface, or other interface. In other implementations, the method 200 can be initiated automatically by a system. For example, the method 200 (or portions thereof) can be periodically performed, or performed based on one or more particular events or conditions such as a user opening an application such as a communications application, receiving one or more invitations or messages from other users or devices to communicate, etc. In some implementations, such conditions can be specified by a user in custom preferences of the user. In some implementations, the method 200 or portions thereof can be performed with guidance by the user. For example, a user can designate content or content items to be processed by method 200. In one non-limiting example, method 200 (or portions thereof) can be performed on a cell phone, camera, tablet computer, wearable device, or other client device that provides communication functions for a user. In addition or alternatively, a client device can receive content or content items from a server over a network, where the server processed the content using method 200 or portions thereof.

In the various implementations described herein, reference is made to "content," "works of content," and "content items." Content can be a type of information, such as text (books, magazines, papers, letters, etc.), images, video (movies, shorts, clips, etc.), audio (e.g., music, voice recordings, sound excerpts from a video source, etc.), games (e.g., a video game, a recording of game play, or other game-related information), or geographic location (e.g., map data, GPS data, images of scenery, etc.), or a mixture of two or more of these types. Each work of content is a complete and self-contained work or piece of content, such as a movie, a song, an album, a news article, a game, etc. A content item is portion of content that can be a work of content, but is more usually a portion of a work of content or is derived from/related to a work of content, such as a clip or excerpt from a movie or sound recording, a paragraph or sentence from a text work, a still image related to a text work or music work, a video recording of game play from a game, a portion of a map, etc.

In block 202 of method 200, the method preprocesses content items derived from stored content and related to activity of a user using one or more devices. The content items can be obtained from a variety of sources of stored content, including a user's own data, networked storage, content sites, social networking services, and/or other storage. The content items are the related to activities the user has performed with the device, e.g., while using the device or while the device is located on the user (e.g., worn or carried). The content items can be collected into a group in which the content items have been ranked according to their likely relevance or desirability to use in a real-time communication. Some examples of preprocessing content items in block 202 are described below with reference to FIG. 3.

In block 204, the method determines that the user is (or will be) participating in a communication using a device. For example, the communication can be a real-time communication, and the user may be participating in the real-time communication using a device that is performing method 200, or a different device than the device performing method 200. A "real-time communication" can be any type of communication session over a communications channel allowing a real-time exchange of information between users of devices, e.g., where the users receive each other's sent information in the communication with very little delay (e.g., on the order of 10 seconds or less). For example, the real-time communication can be a text chat between two or more devices in which users input text in chat window(s), a text messaging (or instant messaging) session between two or more devices in which users message each other in real time, an audio phone call or other voice call session between two or more parties, a video conferencing communication providing visual and audio communication, or a combination of any of these. The method can detect the real-time communication in any of a variety of ways. For example, the user of the device may open a communication application, such as a chat program, messaging program, videoconferencing program, etc. Or, the user may dial a phone number, send a text message, or otherwise input an address to one or more other devices that initiates a communication with one or more other users of those devices. In other cases, the device may receive an invitation or message from another device that initiates the real-time communication. In some implementations, the user can indicate to the device that he and or she wishes to start a communication now or in the near future, and would like to access features of method 200 as described herein. In other implementations, the communication can be non-real-time, e.g., a one-way instant message or email message that is not intending an immediate view by the recipient nor an immediate reply from that recipient.

In block 206, the method determines a set of content items to be available to the user for the communication. The set of content items can include content items that have been ranked as to how likely they will be needed or desired by the user during the communication, as well as content items based on current activity of the user, a search and selection of content items by the user, and/or contributions of users in the communication. Some examples of determining the set of content items are described below with reference to FIG. 4.

In block 208, the method causes a presentation of the set of content items with the device for the user's selection. For example, the presentation can be a display of one or more of the content items in the set on a display screen of the device, e.g., in a list, chart, or other visual format. For example, in a text chat or video teleconference, a content item menu can be displayed to the side for user selection. The content items can also be an augmented reality display overlaid in a field of view of a device. Some implementations can display the presentation of content items in response to a user command, such as selecting a graphical button, speaking a voice command, etc. In some implementations, the presentation can include output in another form, such as audio output, haptic output, etc. For example, the content items can be spoken to a user using voice synthesis or other technique, e.g., alongside other user's voices and/or during pauses in the communication.

In block 210, the method checks whether a selection from the user of one or more of the content items has been received. If not, the method continues to block 214, described below. If the selection is received, the method continues to block 212, in which the method provides the selected content item or items for transmission in the communication to the device(s) of one or more of the other (receiving) users. The other users are participating in the real-time communication with the user. For example, the method can provide the selected content items to a wireless transmitter of the device, or can provide content items to a component of the device providing network communication, telephone communication, or other communication signals, to be transmitted to the other, receiving user(s). In some implementations, the selected content items are also displayed for the sending user to indicate their transmission in the communication. The selected content item can be presented by the receiving users' device, e.g., displayed on a display screen alongside text in a text chat or in a location on a videoconference display, or output in audio form from one or more speakers.

Some implementations can present and/or transmit attribution information for the content items. For example, this can be information describing and/or directly linking to (e.g., using hyperlinks) the source or author of the content in the content items and/or copyright indications. Attribution information can be displayed or output in the presented set of content items in block 208, and/or sent and output with the transmitted content item(s) in block 212.

In block 214, the method checks whether the real-time communication session has ended. In some cases, it may not be obvious whether a communication has ended. For example, if the user sends a text message to another user but receives no reply message, a communication may have ended, or may not have ended if the other user eventually sends a reply. In some implementations for such cases, the method can determine that a communication has ended if messages have not been sent in at least two directions (e.g., from two parties of a communication) within a predetermined time period. In some implementations, the user can input a command or selection the method interprets as ending the communication, e.g., closing a communication application, etc. If the communication has ended, the method can return to block 202 to continue preprocessing content items, e.g., updating content items to be ready for any new real-time communication involving the user (block 202 can also be performed during the performance of other blocks of method 200). If the communication has not ended, the method can return to block 206 to determine whether to adjust the set of content items presented to the user, e.g., based on new topics, ideas, or feelings expressed in the communication by users, or based on other conditions that may have changed.

Thus, the method allows automatic presentation of content items that are relevant to a user's experiences and/or relevant to the current communication, without a user having to manually search for or have ready content items during the communication. Therefore, less effort and resources are needed for a user to effectively communicate creative content items in real-time communications.

Figure 3:
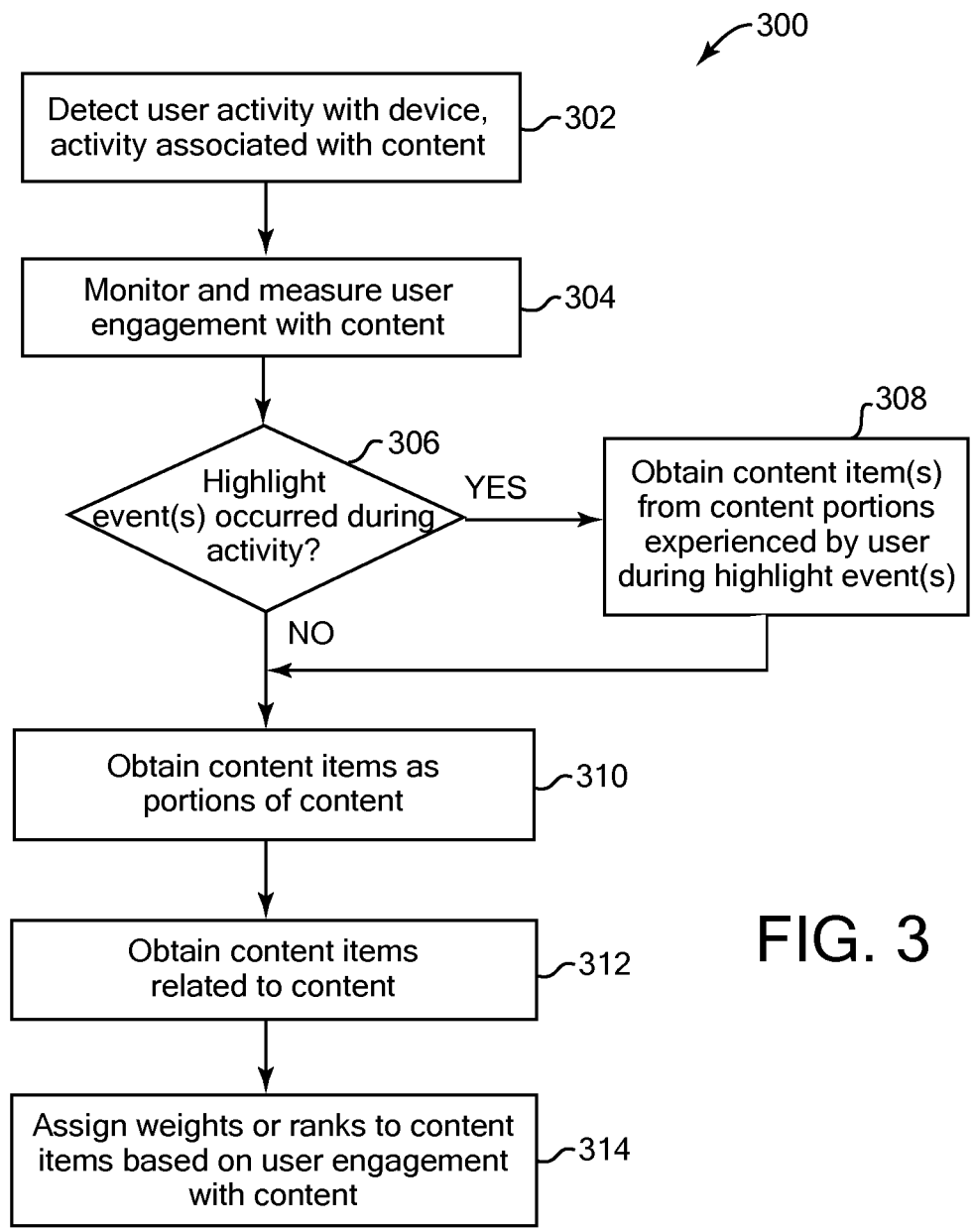
FIG. 3 is a flow diagram illustrating an example method for implementing a block of FIG. 2 in which the method preprocesses content items derived from stored content.

FIG. 3 is a flow diagram illustrating an example method 300 implementing block 202 of FIG. 2, in which the method preprocesses content items derived from stored content, according to some implementations. Method 300 can be implemented by a system such as a client device and/or server as described above for method 200. Method 300 can be implemented by the same or different system than a system performing blocks after block 202 in method 200. For example, method 300 can be implemented regularly or periodically on a user's device or devices, independently of the user's communications, so that new content items are regularly obtained and the rankings of all obtained content items for the user are regularly reevaluated and adjusted, if necessary.

In some implementations, user activity can be detected and monitored (as described below) on any of multiple devices used by the user, and/or method 300 (or portions thereof) can be performed by a system that is not the same as the device with which the user is performing an activity. For example, a server or client device (such as a desktop or laptop computer) may be operating on standby and can detect via wired or wireless signals if the user operates other client devices, such as a cell phone or tablet computer. Such a server or client device can perform 300 based on user activity sensed by the remote client device that the user is using or carrying. For simplicity, in the example implementations described for FIG. 3, the method 300 is described as being run on the same device with which the user is performing an activity.

The obtained content items described below can be stored on local and/or remote, network-connected storage device(s) that are accessible to the method 300. In some implementations, content items can be stored on storage devices that are also accessible to methods 200 and 400 described herein.

In block 302, the method detects user activity on the device (and/or other devices of the user) which is associated with stored content. In some implementations, this detected activity can be treated as a "trigger event" that can cause the method to obtain one or more content items, as described below. In some cases, the user activity can be an activity associated with the device but external to and separate from any real-time communication (or communication program) performed or used by the device to communicate with other devices. The activity can be any of a variety of different activities, and can be associated with a variety of different types of content or works of content. For example, the activity can be the playback of video content data on the device so that the user can watch the video data and listen to any audio content data accompanying the video data, such as movies, television series episodes, short video clips, personal or home movies, music videos, instructional videos, advertisements, etc. In another example, the activity can include playing audio content data with the device so that the user can listen to the audio data, such as music, voice recordings, sound effects, etc.

In another example, game content can be run on the device so that the user can play and/or interact with a game as an activity. In a similar example, a non-game application can run on the device so that the user can interact with the application as an activity, where the application program is based on application content data. For example, the user can access one or more websites, webpages, or user-provided content over a network using a browser application program on the device, and/or select links in a search engine. In another example, text content can be displayed on the device so that the user can read the text content as an activity, such as a book, document, article, web page, e-mail, etc. In another example, the user can perform an activity in which the user and device travel to particular geographic locations, and the user can read geographic content based on the readings of geographic sensors of the device (such as GPS) and which is displayed by the device, such as map content data, informational content about the location, images of the location, etc. In another example activity, the user can be using a mode of transport while carrying or wearing the device or the one or more other devices, such as a car, train, airplane, boat, etc., which the device can detect via motion sensors, GPS, or other sensors. In another example activity, the user can perform a physical activity while carrying or wearing the device or the one or more other devices, such as jogging, swimming, lifting weights, climbing, etc., which can be detected by device sensors.

In block 304, the method monitors and measures user engagement with at least a portion of content during the activity. Thus the method can evaluate the engagement of the user with the content during the activity. In some implementations, the method performs block 304 until the activity is complete. The user engagement with content can be estimated in any of a variety of ways. For example, evaluating engagement can include examining the user's actions during the user's experience of the content. In some examples, the method can log actions of the user occurring during the activity if those actions are detectable by the device. Some actions of the user during the activity can be considered to indicate more engagement of the user with the content, while other actions of the user during the activity can be considered to indicate less engagement if the user with the content. The method can automatically monitor and evaluate user engagement and user activity with the device relative to content based on a variety of signals as described below, and without the user providing his or her own judgments about the activity or the content, e.g., without user comments and ratings about experienced content and activities. In some implementations, the method can assign one or more engagement scores or other measures to indicate a magnitude of estimated engagement of the user.

In some examples, the method can track the user's engagement with a work of video content such as a movie played by the device by monitoring user actions which are input to the device while the user is watching the video content on the device (assumed to be watching by the device, or confirmed watching with cameras of the device). For example, actions such as replaying parts of the video content, playing the entire movie without interruption, and/or turning up the audio volume during movie playback, can be considered signals that indicate greater engagement of the user with the video content, while user actions such as pausing playback of the video content (and/or a high frequency of that pausing throughout the movie), turning down the audio volume during the playback, and or skipping past parts of the video content can be considered signals that indicate lesser engagement of the user with the video content. Some implementations can also log and examine other actions of the user, such as by detecting and/or recognizing the user's voice during the activity, e.g., using voice recognition techniques. For example, if the device detects the user laughing or recognizes exclamations from the user indicating that the user is enjoying the content, then the method can consider these detections as signals indicating greater engagement with the content. Similarly, if the device detects and recognizes user exclamations that indicate user negativity or disappointment, then lesser engagement can be indicated.

Similarly, the user's activity involving other types of content can be monitored. In an example in which the user is playing audio content on the device, the method can check for engagement indications as described above for video content. For example, greater engagement can be indicated by actions including replaying portions of audio content, raising the playback volume, and listening to audio content without interruption, while lesser engagement can be indicated by actions including skipping portions of the content, lowering the playback volume, and pausing the playback. Furthermore, the method can detect the voice of the user similarly as in the video content example above to obtain signals of engagement.

In some implementations, the method can look at additional or other indications of user engagement. For example, the device can include motion (e.g., force and direction) sensors such as accelerometers and gyroscopes to detect whether the user is moving during playback, where a predetermined amount and/or frequency of such movement may indicate less user engagement because the user is performing other activity while experiencing the content. For example, a particular type of user movement during music playback can indicate that the user is jogging, and thus is not as engaged with the music as when the user is mostly staying still. In some cases, detected greater or faster movement of the user and device can indicate less engagement than less or slower movement.

In another example, the user's activity can involve playing a game on the device. The method can monitor user actions during the game play to help determine user engagement. For example, if the user plays the game for relatively long time, replays parts of the game greater than a threshold number of times, plays the game for relatively long time (e.g., over a threshold) without interruption, or speaks exclamations indicating joy or triumph, then greater engagement can be indicated. In contrast, if the user quits the game shortly after starting it, pauses the game often, or speaks exclamations indicating anger or frustration, less engagement can be indicated. The method can also look for other signals of greater engagement, such as attaining a high score compared to previous user performances in that game, or attaining some other objective in the game that is never or rarely attained by the user. Similarly, in some implementations the method monitors engagement of the user who is interacting with some other type of application program, such as a drawing program, spreadsheet, word processor, web browser, or other application. Engagement can be similarly measured, e.g., based on amount of time of use of the application, use with or without many interruptions, frequency of user input (e.g., mouse clicks or touches to the display screen), recognized user utterances, etc. In some implementations, the method can estimate if the user is having difficulty or frustration using a software program, e.g., via voice exclamations from the user, repeated selection of program functions that are followed by "undo" commands, etc.

In another example, the user's activity can involve reading text content, and user engagement with the text content can be monitored by examining similar indications as described above for other types of content. For example, the length of time reading the text content, continuous or interrupted reading, device motion during reading (where greater device motion indicates less engagement), skipping or re-reading parts of the content, and performing other activities while displaying text content can all indicate greater or lesser engagement as appropriate.

In another example, the user's activity can involve traveling to particular geographic locations. For example, such activity can include visiting tourist locations on a holiday or vacation, or visiting any locations, while carrying or wearing the device such that the device can detect the locations visited. The method can monitor engagement with a location by checking how long the user stayed at the locations, how active or in motion the user is at the locations (e.g., by measuring device motion), and checking whether the user took photos at the location, e.g., using a camera in the device, and how many photos were taken. For example, the longer that the user stayed or lingered instead of passing through a location, the greater is the indicated engagement. In some cases, the more active is the user at the location, the greater the engagement indicated as compared to a user sitting still at the location (unless the user is detected at a vista point via GPS sensors, etc.). The more photos the user took at the location, the greater can be the indicated engagement. Voice recognition can also be used to examine user words or exclamations uttered at the location and determine engagement therefrom, similarly as described above.

In some implementations, at the end of the activity, the method can consolidate or combine various indications of engagement into a total engagement indicator or engagement score, where greater engagement can be indicated with a positive score and lesser engagement can be indicated with a negative score. Multiple scores can also be retained for each activity, based on different types or categories of signals or engagement.

In block 306, the method checks whether any highlight events occurred during the user's activity. A "highlight event," as referred to herein, is an event or occurrence that occurred during the activity and which is likely to be a notable event, e.g., likely to have made a greater impression on the user than average events. A highlight event can indicate a very high level of user engagement with content, and thus indicate a higher likelihood that the user will remember the involved content and will want to use or discuss content items associated with the highlight event with other users in a communication, in comparison to content items associated with more average or everyday events in the users activities. The method can check for predetermined types of highlight events, based on the type of content that is involved in the user's activity. For example, a scene in movie content may causes the user to laugh or utter an exclamation, and this event can be marked as a highlight event by the method, along with marking the portion of content being experienced by the user at the time of the highlight event. In another example, if the user reaches a very high score or attains a difficult objective in a game, the method can log such an occurrence as a highlight event. In some implementations, the method can check for replays or re-readings of content over a predetermined number of times and within a predetermined time period to indicate a highlight event.

If no highlight events occurred during the activity, then the method continues to block 310, described below. If one or more highlight events occurred during the activity, the method continues to block 308 in which the method obtains one or more content items from the portion(s) of the content experienced by the user during the highlight events. This obtaining can include creating one or more content items, and/or retrieving one or more pre-created content items. For example, if the user made an exclamation while watching a particular scene in a movie, then one or more content items are obtained which are related to that particular scene.

In some implementations, the method can create one or more content items from the portion of content associated with a highlight event. Additionally or alternatively, the method can obtain content items in other ways. For example, the method can perform a search on the Internet and/or search in other accessible data sources to find content items matching the content experienced in the user's activity or related content items of a different type than the experienced content. For example, the method can search local storage of the device, network-connected storage in a local-area network (LAN), etc. In some implementations, content items suitable for use in real-time communications can be available in and downloaded from Internet online repositories of content items that are contributed by many users and or devices, and which can be categorized according to title, subject, or other characteristics of the content unit from which they are derived, and also can be categorized based on duration of content item (for playable content items), storage size, etc.

In some examples, the method can extract a clip or excerpt from a video content unit or an audio content unit that was played during a highlight event, e.g., within a predetermined playback time period of the highlight event. In an example of the user playing a game, the method can record the game play as video content, and can extract a video clip of this recorded game play within a predetermined time period of a highlight event such as attaining a new high score or a particular objective in the game. In the case of text content, the method can extract one or more paragraphs or sentences that were read by the user at about the time of the highlight event (as near as can be approximated by the method, since it may not be known by the method which text was actually being read by the user unless particular sensors of the device are employed, such as eye detection or eye-movement sensors.). In the case of location content, the method can obtain one or more photos taken by the user during the highlight event (that were taken close in time to the highlight event, e.g., based on a threshold time period), or can obtain a section of an online map pertaining to the user's location at the time of the highlighted event.

In cases where the method extracts a clip or excerpt of content to create a content item, the excerpt can be constrained in duration (when played at normal rate) by a predetermined duration limit. In some examples, the predetermined limit can be 2 minutes or less in length, 1 minute or less, 30 seconds or less, or 10 or 5 seconds or less. Such examples indicate the desire of some users to keep the length short for content items, which can be used like short messages sent in real-time communications in which users are exchanging information, and thus a longer length item might interrupt the communication exchange and flow.

In some implementations, the method can also or alternatively create or otherwise obtain content items that are of a different type of content then the content used in the user's activity and which are related to a highlight event, similarly as described below and with reference to block 312.

Also, in some implementations, content items (as referred to throughout this description) can include metadata in a standardized format. For example, metadata of a content item can include the title of the content the content item is extracted from or related to, a scene label or index, genre label, time of content item creation, time and/or physical location of the user activity that is the basis of the content item, links to the original content source of the content item, and/or other metadata information. In some implementations, block 308 can add this metadata to any created content items or retrieved content items which do not have all the looked-for metadata, if such metadata information is available in connected databases or other data storage.

After block 308, or if no highlight events occurred as checked in block 306, the method continues to block 310 in which the method obtains one or more content items as portions of content related to the users activity detected and monitored in blocks 302 and 304. (In some implementations, if content items have been obtained based on highlight events in block 308, then additional content items need not be obtained in blocks 310 and/or 312 unless additional content items are sought.) Content items can be obtained in block 310 similarly to content items obtained in block 308, except that in block 310 there are no highlight events to direct the obtaining of content items. In various implementations, the method can create content items, retrieve content items, and/or can otherwise obtain content items from one or more data sources.

To create content items, the method can extract clips, excerpts, or other portions from a work of content involved in the user's activity. For example, in some implementations, the method can extract portions from predetermined sections or locations within the work of content. In various examples, the method can extract the title portion from the beginning of video content such as a movie, can extract a predetermined a number of seconds at the beginning of audio content such as a song, can extract the title, or first/final paragraph of the text work of text content such as a book or article.

In some implementations, the method can analyze the relevant work of content and determine which portions to extract for content items based on the analysis. For example, the method can scan scenes of video data and extract portions which have predetermined characteristics known to be popular or common based on machine learning techniques and/or other data from popular online usage. For example, predetermined characteristics can be sought such as a greater amount of fast movement within the scene, short and fast scene switches, other types of scene transitions, lighting or sound transitions, and/or content of scenes (e.g., fighting, fast motion, kissing, etc.). In another example, the method can examine a unit of audio content such as a song, and can extract a portion of the song up to the first lyrics, or can extract the first line of the main chorus of the song (e.g., determined by finding repetition of music and words within the song), etc. In the case of text content, the method can extract portions including particular keywords known to be of interest to the user (e.g., through user preferences or previous use of the device by the user), the last paragraph the user has read, the title and first paragraph of the book or article, etc. In the case of location content, the method can search for images or map data having labels or tags matching location names at the location in which the activity occurred, and/or can create content items including names of locations provided in a list of locations visited by the user. In an example of game content (or other application content), the method can create content items that are portions of video recordings of the game play, or still images of the score for objectives completed in the game (or the images captured by the user during game play), images of the display screen during interaction with the application, etc. For any these types of content, the method can also examine data from large populations of users indicating which portions of a particular work of content are most often selected and/or shared by users, and can extract those same portions as content items.

In one example, the method can create an animated clip of sequential images from a movie or other video data or collection of images. For example, an animated GIF (Graphics Interchange Format) is a short sequence of frames showing an animation or motion. The method can create such an animated sequence by taking frames from source content, such as video content and/or images or recordings of game play or application use. Other types or formats of animations can alternatively be created.

The method can create other types of content items in some implementations. For example, the method can create a montage or collage as a content item, which includes multiple different portions of content. For example, the method can create a montage of several different scenes of a movie by extracting the scenes from different points in the movie stream and assembling those scenes together, e.g., sequentially or in some other order. A montage can include animated sequences or scenes from a movie, and/or can include still images taken as frames from the movie, and when presented are each displayed for a predetermined number of seconds. Similarly, the method can create a montage of multiple audio clips from a song, an album, a band's collection of albums, a genre of music, etc. The method can create a content item that is a montage of scenes (e.g., screenshot images) from a game played or application used.

In some implementations, the method can create content items directly based on the user's interaction with the content. For example, if the user watched only a portion of a movie, then a scene from that portion can be extracted and made into a content item, while non-watched portions of the movie can be ignored or reduced in relative value as content items.

If the user performs a combination of multiple activities, the method has knowledge of this combined set of trigger events (e.g., performed by the user at least partially simultaneously) and can create content items based on the combination. For example, if the user is listening to music played on the device while the user is jogging as in the example above, the method's knowledge of the music being played and knowledge of the jogging route and locations visited, distance covered, average speed, etc. (based on sensors of the device) can potentially be used to create one or more multi-faceted content items that combine some or all of these triggers together. In one example, the method can create a content item that is a montage of images of locations or scenery along the user's jogging route (e.g., obtained from online map sources, user photos, etc.) and which has accompanying portion(s) of music playing during the montage that are portions of the same music the user listened to while jogging (or music of a related type or genre). In addition, the method can add displayed distance numbers to the images in the content item that indicate how many miles the user had jogged when he or she reached the location depicted by each image, and/or include in the content item a display of the speed of the user while jogging at the associated image locations. In some implementations, the method can create content items based on combinations of activities and/or content which the user did not perform or experience simultaneously.

In some implementations, the method can obtain these and other types of content items by retrieving the original content from one or more data sources, such as local storage, local network attached storage, remote storage over networks, or other sources, and extracting content items from retrieved units of content. For example, the data sources can include content web sites, social networking services, or other sites providing content produced by users.

The method can also obtain previously-created content items directly from data sources instead of creating the content items. For example, one or more users, companies, institutions, or other entities may have created content items suitable for use in real-time communications and stored these content items in a data repository or other storage area accessible to the method. For example, in some implementations these content items may be categorized and organized such that the method can search the content items for content items that are relevant to the activity or to the content involved with the activity.

In block 312, the method can obtain content items which are related to the work of content involved in the user's activity and which are not portions taken from the work of content itself. These can be content items that are of the same type, or of a different type than the content used in the user's activity. In some examples, if the content type involved in the user activity is audio such as music from a particular band, the method can search data sources for other, related but different types of content, such as images of the band, music videos or other video footage of the band playing, album cover images for the band's music, montages of such album cover images, publicity shots or interviews of band members (video and/or audio), maps and geographically-relevant images related to the music selection, etc. In some cases, the method can manipulate or otherwise edit retrieved content into a format more appropriate to be a content item. For example, for content such as interview and music videos, the method can take excerpts from the content to make content items that are shorter in length and more appropriate for real-time communications, as described above. In another example, the method can collect multiple images of content, such as different album covers or publicity shots of the band, and create a montage of the multiple images which, if presented, displays images in the montage successively, each for a few seconds. For a movie, the method can create content items of images (frames) from the movie, and/or obtain (e.g., create or retrieve) montages of still images of characters, action, or locations in the movie, and/or can obtain publicity posters, interviews of actors, related soundtracks or screenshot images from related games, etc.

In another example for game content, the method can obtain content items that are montages of images of the player avatar or other character within a played game, images of scenes, the score, or completed objectives in the game, leader boards showing the user's competitive position in comparison to other game players, video clips from the introduction of a game, and/or other game-related information. Similar content items can be obtained for other application programs used by the user. In some examples, if the method detected unfamiliarity, frustration or anger by the user when using the program, then content items can be obtained which can include instructional or tutorial content for that program, which can assist the user or assist other users in a communication once the content item is transmitted to the other user. In some implementations, an obtained content item can include advertising or educational content for a particular product or service if appropriate user activity is detected that is related to the product or service, such as browsing web pages with a web browser or searching in a web search engine for particular types or instances of products and/or services. In some implementations, instructional and/or advertising content items can be obtained during blocks 308 and/or 310 as well.

In another example of geographic or physical location content items, the method can obtain panoramic images of a user-visited location and obtained from an online map database, which can be used as content items. The method can also create montages of notable local sites and or maps, or use 360-degree images of the location as content items. In another example, if the content is text content such as a book, the method can obtain images that show, for example, depictions of the book cover or book jacket, author, magazine cover, portions from a related movie, music, or game, montages of multiple such related images, etc.

In some implementations, the user can manually create content items. For example, a user can manually cut a scene from a video file using a video editing program. Or, a user can manually extract a portion of audio data, cut and paste a portion of text data, create an image content item from a recorded screenshot or video of a played game or other used application program, and/or select a portion of a map or other location content using appropriate application programs or tools. The user can save an extracted content portion as a content item and, in some implementations, can add metadata such as the title of the content the excerpt is from, a scene label or index, genre label, etc. Such content items can be obtained by the method and assigned a relatively high engagement score due to the user's direct involvement in creation. In some implementations, the user can provide engagement indications for manually-created content items, which the method can normalize to its own scale used for automatically-obtained content items. Furthermore, in some implementations the manually-created content items can be stored by the system for use by other users in the future (assuming the rights to such content items have no issues). Thus, each manually-created content item has the potential to add to the common store of content moments, e.g., in an accessible repository of content items.

In block 314, the method assigns weights or ranks to obtained content items based on the user engagement monitored in block 304. For example, the method can assign higher weights or ranks to content items associated with greater engagement of the user with the associated content, and can assign lower weights or ranks to content items associated with lesser engagement of the user. In one example, the content items can be assigned ranks consistent with or proportional to their total engagement scores, if such scores are being determined. In addition, weights or ranks can be adjusted based on other factors or conditions. For example, known user preferences for certain types of content or certain subject matter can increase the ranks of content items related to those preferences. In some implementations, the ranks can be adjusted based on how recently the user engaged in the activity associated with the content item, e.g., where content items for more recent activity are assigned higher ranks than content items associated with older activities.

The method end after block 314. In some implementations, the method can then return to block 302 to continue to detect user activity on the device and to monitor user engagement in the activity, obtaining and ranking new content items as appropriate.

In some implementations, blocks 306-314 can be performed after the user's activity has ended. In other implementations, at least portions of blocks 306-314 can be performed during the user's activity while the method continues to monitor the ongoing activity.

Figure 4:
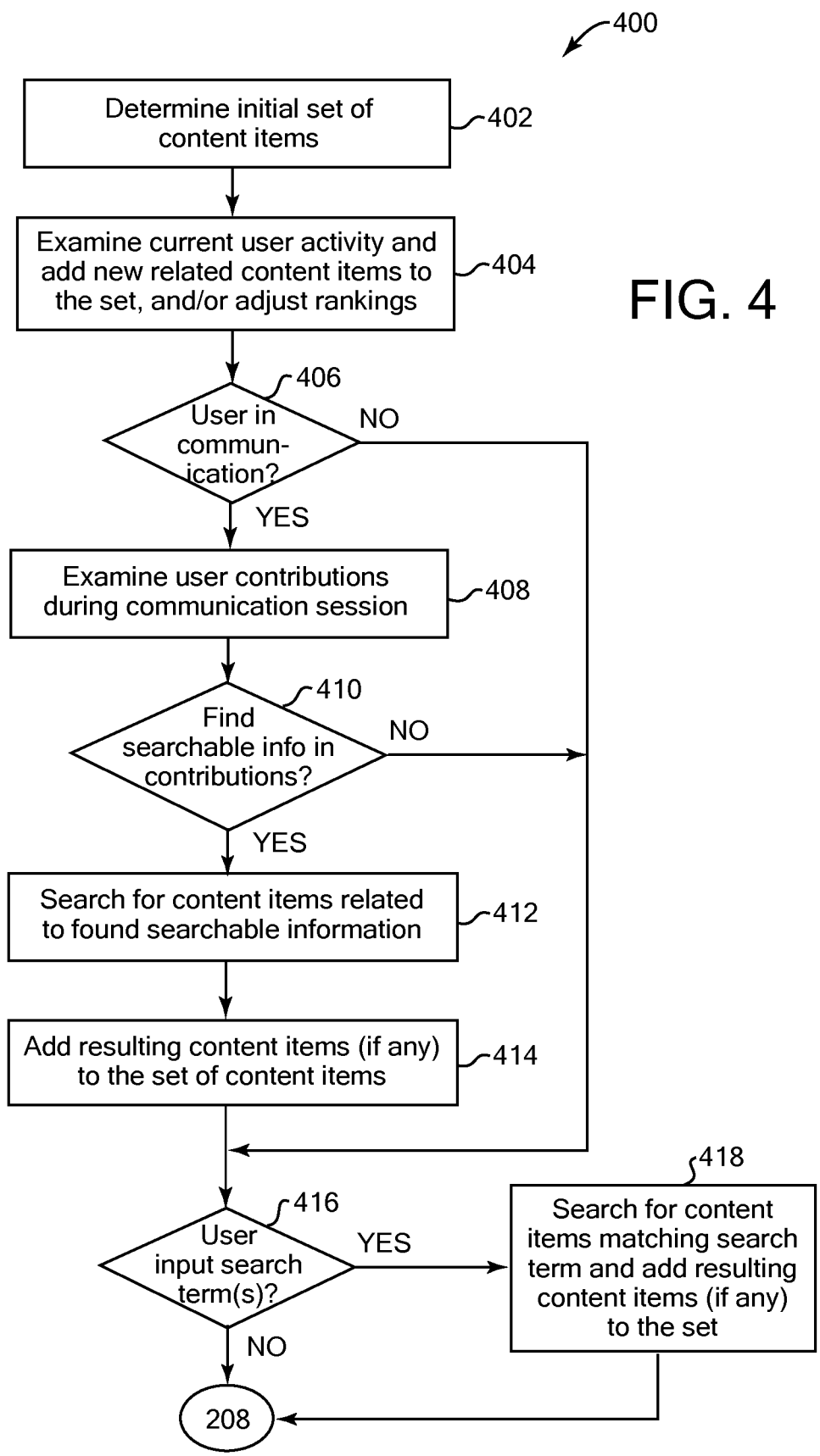
FIG. 4 is a flow diagram illustrating an example method implementing a block of FIG. 2 in which the method determines a set of content items for the communication in which the user is participating.

FIG. 4 is a flow diagram illustrating an example method 400 implementing block 206 of FIG. 2, in which the method determines a set of content items for the communication in which the user is participating, according to some implementations. Method 400 can be performed by a client device or server device similarly as described for FIG. 3, such as a device used by the user to participate in the real-time communication. In some implementations, method 400 (or portions thereof) can be performed by a different, connected system instead of the device with which the user is interacting for the real-time communication.

In block 402, the method determines an initial set of content items. The initial set content items can be collected from all or some of the entire pool of ready content items obtained during previous user activity with the user's device(s) and which are stored on storage device(s) accessible to the method (e.g., local storage and/or remote, network-connected storage). For example, content items can be obtained by the method 300 as described above with reference to FIG. 3 which are provided to or retrieved by the method 400. This set can be based on the rank (or weight) of those content items assigned in the method 300 of FIG. 3, for example. One or more manually-created content items from the user can also be included in the initial set of content items.

In some implementations, block 402 includes ordering all of the known content items in a list from most desirable to lease desirable based on the assigned ranks (e.g., based on engagement score) of the content items, and based on any other characteristics such as user preferences, recency, etc. For example, some content items can be omitted from the set if those items are associated with user activity that occurred too far in the past, e.g., outside of a predetermined time period (e.g., threshold) before the real-time communication (or, such recency considerations may already be taken into account in the rank assigned to content items in method 300). In some implementations, the method can take a predetermined number of the top content items having the highest ranks and put those content items in the determined initial set. In some implementations, block 402 can be skipped on later iterations of method 400 during a particular real-time communication, since the set of content items will have already been initialized.

In some implementations, the method can organize the set of content items into appropriate categories. If the set of content items has a large number of items, such categories can allow the user to more easily find desired content items during a real-time communication. For example, the categories can be a standard set of categories, and/or user-created or determined based on user preferences or user geographical region, such as "funny," "crying," "fail," "football," and "latest." In some implementations, the categories can be determined based on group preferences of a group to which the user belongs (e.g., a user group in a social networking service), and/or can be created by the method based on metadata (labels, tags, etc.) or other data associated with content items or associated with works of content related to the content items. In some examples, categories can present currently popular content items determined from user comments, ratings, and use from online websites or trackers. Some content items can be based on current events, seasons, or holidays and presented in appropriate categories created for such events, and updated for new occurring events.

In block 404, the method examines current user activity with the device and adds new related content items to the determined set (if appropriate), and/or adjusts ranks of content items in the set. The new content items may be highly relevant to the user since they are related to the user's current activity or situation during (or just before) the real-time communication. For example, the current activity of the user can be occurring during the real-time communication and can be unrelated to the communication and to communicating with other devices using the device or the other devices, e.g., activity performed with the device but external to and separate from real-time communication. For example, the user may be watching video content, listening to audio content, playing game content, reading text content, and/or visiting a particular location with the device at the same time as communicating in the real-time communication, or switching between the real-time communication and the other activit(ies) with the device. In some examples, content items can be obtained based on the video content, audio content, text content, or game content with which the user is active, similarly as described above with reference to method 300 of FIG. 3.

In addition, content items can be obtained that are related to the current location of the user as described above, which can include the current environment of the user, such as weather conditions, temperature, riding in a vehicle, etc. Content items can also be created based on current physical activity of the user, such as jogging, swimming, etc. For example, content items can be obtained that are related to sunny weather if the weather is currently sunny at the user's location. In another example, content items can be obtained that are related to trains or train stations if the user is currently in a train station or riding in a train. Such content items can be, for example, derived from or based on movies, songs, text, or games related to trains. In some implementations, recent content items can be retrieved (e.g., downloaded) and added to the content item set from data sources for instructional, educational, or advertising purposes (e.g., if permitted by the user in preferences). For example, such content items can provide instructions on how to operate software or other product, or can describe or relate to a recently-released work of content (e.g., movie, music album, game, book, or other work of content) or to a product or service.

In some implementations, content items obtained in block 404 can be added to the top or near to the top of the set of content items (e.g., high or highest rank), thus indicating their high importance and relevance to the communication. For example, such content items may be important since the user may be discussing his or her current environment or other conditions in the real-time communication.

The method can also adjust rankings in block 404 of content items in the set. For example, the new content items based on current activity can shift other content items to a different rank, such as a lower rank. In some implementations, ranks can be changed based on user selections of content items, e.g., before or during the communication in previous iterations of method 200 and method 400. For example, if the user selects a presented content item (e.g., as checked in block 210), this selection can cause the selected content item to be raised in rank relative to other content items in the set due to the current user interest in that item. Thus, that content item is placed and displayed higher in the presented list in the next iteration of methods 200/400. Other implementations can do the opposite, e.g., lower a content item's rank after user selection of that item, on the assumption that the user will not want to select it again very soon.

In block 406, the method checks whether the user is participating in a real-time communication. In some implementations, method 400 can be initiated before the user actually starts the communication, such as in response to the user selecting a particular control to be presented with content items, or while the user is waiting on other users to join the communication, such as waiting in a chat room or in a conference call. In some cases, it may not be obvious whether the user has begun a communication. For example, if the user sends a text message to another user but receives no reply message, a communication may not have started. In some implementations for such cases, the method can check whether messages have been sent in at least two directions (e.g., to two parties of a communication) within a predetermined time period in order to decide that a communication has started.

If the user is not participating in a communication, the method continues to block 416, described below. If the user is participating in a communication, the method continues to block 408. In block 408, the method examines user contributions to the real-time communication during the current communication session. The contributions can include any input, such as dialogue, information, comments, opinions, etc. provided by any user in the communication that is intended to be sent to one or more other users participating in the communication, for example. The contributions can be from the user of the device or from any other user participating in the communication. For example, the contributions can be in any form acceptable to the particular communication being implemented, such as text contributions in a messaging context or text chat, or audio contributions (voice communication) in a phone call, audio chat, or video conference, etc. If voice communication is being used, the method can use voice recognition techniques to examine the user contributions.

The method can examine the user contributions for searchable information which can be used to search for content items. For example, the method can search for information input by any user in the normal course of communication that indicates particular subjects or topics which may be related to one or more content items stored in the pool of available content items, and/or related to content items which can be obtained by the method on the fly during the communication. In some examples, the method can search for nouns, proper nouns, names, phrases, etc. or other keywords or keyphrases in the user contributions to the communication. In general, the method searches for information in user contributions, where that information need not be intended by the participating users to be search terms. In some implementations, the method examines user contributions only if all (or sufficient) participating users have given permission for such examination.

In block 410, the method checks whether any searchable information was found in the user contributions to the communication. If not, the method continues to block 416, described below. If searchable information was found, then in block 412, the method searches for content items related to the searchable information found in the communication. For example, the method can search for content items having one or more descriptors matching a word or phrase of the searchable information. In some implementations, the method can search titles, tags, labels, or other information associated with content items to look for a match to the searchable information. In some examples, the method can search for content items among the stored pool of content items available for the user of the device, which were obtained based on user activities in methods similar to that of FIG. 3. The method can also or alternatively search for content items in larger data sources, such as Internet content sites, social networking sites, or connected databases. In some implementations, the method can search a repository of content items stored and accessible sites on the Internet and contributed by multiple users, devices, and/or other entities. For example, if the user in the communication mentions the name of a particular music band, the method can search the local pool content items and all other available, network-connected data sources for content items related to the name (and/or other characteristics) of that band or music of the band.

Some example implementations can make use of a knowledge base in which relationships between terms leads to finding similar subjects or terms in meaning or in other relationships. For example, the method can determine related words or subjects, including words or subjects of different scope, based on known stored relationships for the found searchable information, such as relationships stored on an accessible database or knowledge base. In various implementations, the method can also create one or more new content items based on results of the search. For example, the method can extract a relevant portion from of a matched work of content, such as a movie, interview, etc., and create one or more content items for the communication.

In block 414, the method adds resulting content items from the search (if any) to the set of content items initially determined in block 402 and potentially modified in block 404. Similarly to content items added in block 404, the content items added in block 414 can be added to or near the front or top of the set (e.g., high rank), thus indicating high importance and relevance to the communication. Thus, the method can dynamically adjust the set of presented content items based on user activity and/or contributions during the real-time communication.

In block 416, the method checks whether the user has input one or more search terms to the device (or otherwise to the method) in a user search to find one or more content items. For example, before or during the communication, the user may have had an idea for a content item that he or she would like to send in the communication, but which is not available for selection by the user in any presented menu (e.g., a presentation to the user of block 208 of FIG. 2). The user can enter one or more search terms to the device, e.g., using a graphical interface, voice commands, motion commands, or other form of input, to cause the method to search for content items matching the search terms. In some examples, the search terms can be for a particular known content item (such as the title and scene subject in a movie), or more general (e.g., by genre). In some implementations, a hierarchy of categories can be presented to the user, in which the user can browse for content items or quickly find content items in a desired category, similarly as described above for block 402.

If one or more search terms were input by the user, the method searches in block 418 for content items matching the search term, and if any matches are found, the matching content items are added to the set of content items. In some cases or implementations, the method can find previously-created content items, e.g., in the local stored pool of content items, or in online repositories, web sites, or data bases. The method can also refer to knowledge bases to find related subjects and search for the related subjects. In some cases, the method can create content items from found content that matches the search terms, where the content items can be created similarly as described above. In some implementations, matching content items can be added to the top or front of the set of content items to indicate high importance and relevance.

If the user did not include a search term in block 416, or after a search in matching content items have been added to the set in block 418, the method continues to block 208 of FIG. 2 to present the set of content items to the user via the device.

Various blocks and operations of methods 200-400 can be performed in a different order than shown and/or at least partially simultaneously, where appropriate. For example, some implementations can perform blocks of the methods at various times and/or based on events not related to a user participating in a real-time communication. Various blocks of methods 200, 300 and 400 can be performed simultaneously with other blocks. In some implementations, blocks or operations of methods 200-400 can occur multiple times, in a different order, and/or at different times in the methods. In some implementations, the methods 200, 300, and/or 400 can be implemented, for example, on one or more client devices as in FIG. 1, or a server system can perform one or more blocks instead of or in addition to a client device performing those blocks.

FIGS. 5-8 are diagrammatic illustrations of example interfaces which can present shareable content items for user selection before or during a real-time communication, according to one or more features described herein.

Figure 5:
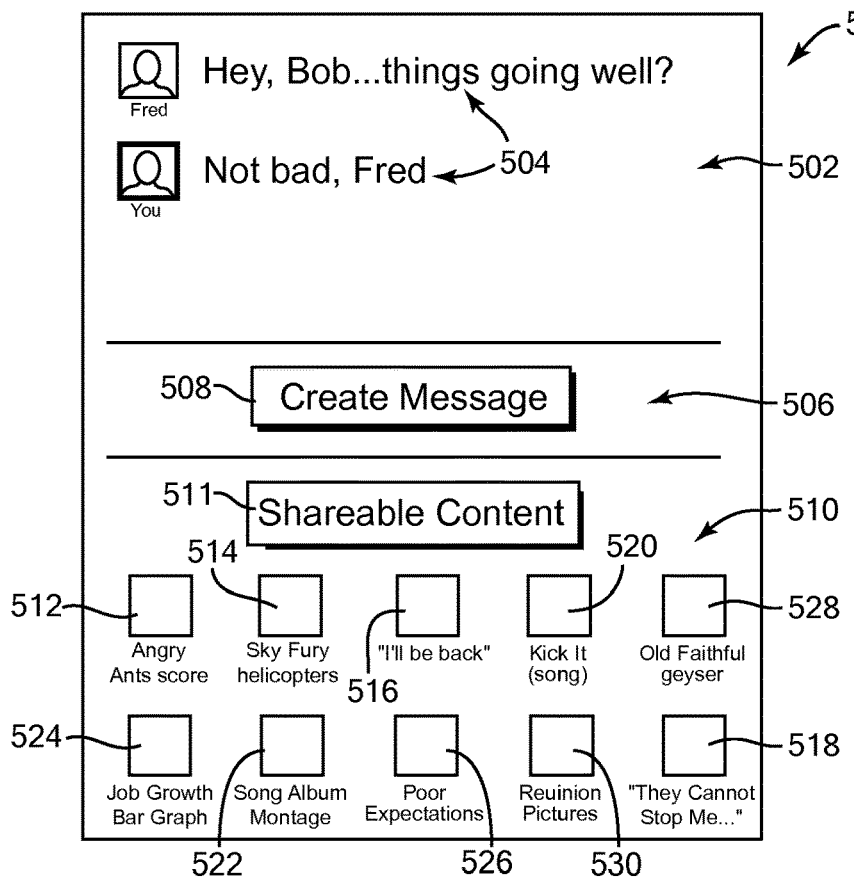
FIGS. 5-8 are diagrammatic illustrations of example interfaces which can present shareable content items for user selection before or during a real-time communication.

In FIG. 5, a display screen 500 of a user's device is shown. Display screen 500 can be provided on a variety of types of devices, such as portable devices (cell phone, tablet computer, laptop computer, wearable devices, etc.), desktop devices (desktop computer, home entertainment devices, etc.), servers, etc.

In one example scenario, the user is using a device with display screen 500, when a text message is received from another user, such as a friend of the user. In some implementations, this can be considered the start of a real-time communication, causing content features to be displayed. For example, upon receiving the text message, display screen 500 can be displayed on the screen of the user's device automatically, or when the user selects that display screen 500 be displayed.

In this example, display screen 500 can include interface display areas shown in FIG. 5. A messaging area 502 can be an area displaying text messages that are exchanged between communicating users in the real-time communication. For example, messages 504 include a message contributed by the user's friend followed by a message from the user. Input area 506 can include various functions or controls for the user to select to input contributions to the communication, such as message creation button 508 that allows the user to input a message to be sent to the communicating user(s). Other implementations can use other controls.

A shareable content area 510 can be displayed on screen 500, e.g., by the messaging program running on the device or other program. Content area 510 can include one or more shareable content items, which can be implemented with various features described herein. In some implementations, the content items in area 510 can be displayed on screen 500 in response to the user selecting a control, such as a button 511, while in other implementations, area 510 can be automatically displayed. In the example of FIG. 5, ten content items are displayed in area 510. For example, these ten content items can be the content items initially determined to be in the set of content items as described in FIG. 4. The displayed content items can be based on user activities performed with the device by the user in the past. In this example, content items can be displayed as icons having a label. The icons can be a reduced size version of an image included in the content item or related to the content item, to assist the user in referencing and selecting from the content items. Each label can be a title or other descriptor related to the associated content. In some implementations, content items showing changing visual content (such as video content items or visual montage content items) can display the changing visual content in their icon form in area 510.

For example, content item 512 can be derived from game content played on the device by the user. In this example, content item 512 is a captured image from a game showing a high score that the player achieved while the game was in action. The icon of content item 512 can be a reduced-size version of that captured image. The content item 512 is placed first in the list of content items in the display area 510 because, in this example, the user was playing the referenced game at the time the user received the first text message in the communication. Since this game-playing is a concurrent or just-previous activity to the communication, the content item 512 is assigned a high priority and is displayed at the top of the content item list in area 510.

Content items 514, 516, and 518 can be derived from video content such as movies that the user previously watched on the device (e.g., within a predetermined time in the past from the current time). In this example, content item 514 is an animated clip (such as an animated GIF) from a watched movie and shows a well-known scene of helicopters flying, and the icon of item 514 shows a reduced-size image from that scene. Content item 516 is a clip of a movie in which a character says a well-known quote, where the quote is the label of the content item 516 and the icon is a reduced version of a movie frame of the character in that scene. Content item 518 is also derived from a movie in which the labeled quote is a well-known quote stated by a character in the movie. In this example, the movie content items 514 and 516 were ranked higher for user engagement (and/or other factors) than the content item 518, and so the content items 514 and 516 are displayed higher in the displayed list of content items. For example, the user may have re-watched the scenes associated with content items 514 and 516, and/or made loud exclamations during the playing of these scenes indicating interest or appreciation, while the user may have paused the movie associated with content item 518 or shown other signs of disengagement, and/or the user had watched the movie further in the past.

Content item 520 can be derived from a work of audio content, such as a song, that the user previously listened to on the device. The icon associated with content item 520 can be a reduced size image of the front of the album cover associated with the song, and the label can show the name of the song or portion of the name. Content item 522 can be derived from multiple music albums that the user listened to on the device. For example, the device can create a montage of album covers from albums that the user listened to recently on the device, where one of the cover images is shown in reduced form as the icon of item 522.

Content item 524 can be derived from text content such as a website or magazine article that the user read on the device. For example, the content item can display a bar graph image from the article (which also included image content). The icon of item 524 can be a reduced-size image of the bar graph image, and the label shown in the area 510 can be derived from a label of that image in the article. Content item 526 can be derived from another unit of text content, such as a book, where the content item can be an image associated with the book (such as the front cover). The label of the item 526 can be the title of the book and the icon can show a reduced-size version of the front cover image.

Content item 528 can be derived from a location that the user visited. For example, the icon of item 528 can be reduced-size image of a photo taken by the user at the location, where the photo is stored on the device or is accessible to the device, e.g., over network connections. The label of the item 528 can be derived from map data associated with the visited location, a tag associated with the photo, etc. Content item 530 can also be based on a location visited by the user for an event, such as a high school reunion, where the content item 530 can be a montage of pictures taken by the user at the location.

In some implementations, the content items can be displayed in various categories, such as content type (e.g., "video" including sub-categories such as "movie moments" or "audio" including sub-categories such as "music" and "voice", etc.), and/or organized by various other categories ("latest," "funny," etc.), as desired by the user. In some implementations, the user can view additional content items available on the device and which are lower rank in the set of content items by providing appropriate input, such as by scrolling the display to reveal additional content items.

Figure 6:
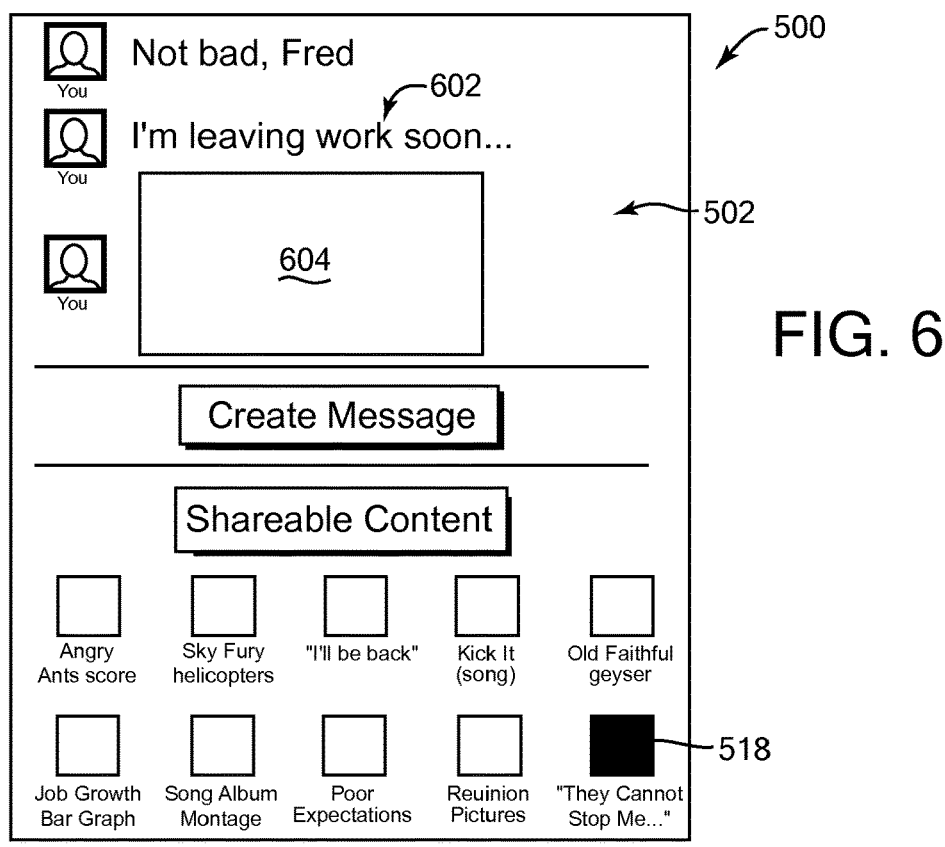

FIG. 6 illustrates the same display screen 500 at a later time. Here, the user has input another text message 602 in the communication and then selected a content item 518 (here, content item 518 is highlighted to show the selection). In response, the icon-sized content item 518 is displayed as larger-sized content item 604 in the messaging area 502 on the next line after the message 602. For example, the content item can be a clip from a movie which is played within the rectangle 604 on a line of text or adjacent to a line of text. The content item 604 can be displayed as an animation that is similar to the scene in the movie content from which it is extracted. In some implementations, content item 604 can repeat its video clip endlessly in a loop, or the user can select preferences to play/repeat content item animations for a predetermined number of times. Some implementations can display content item 604 in a different (e.g., smaller or larger) size than shown in FIG. 6, such as a larger item or window occupying a majority portion of the display screen on the receiving user's device and on the sending user's device.

Figure 7:
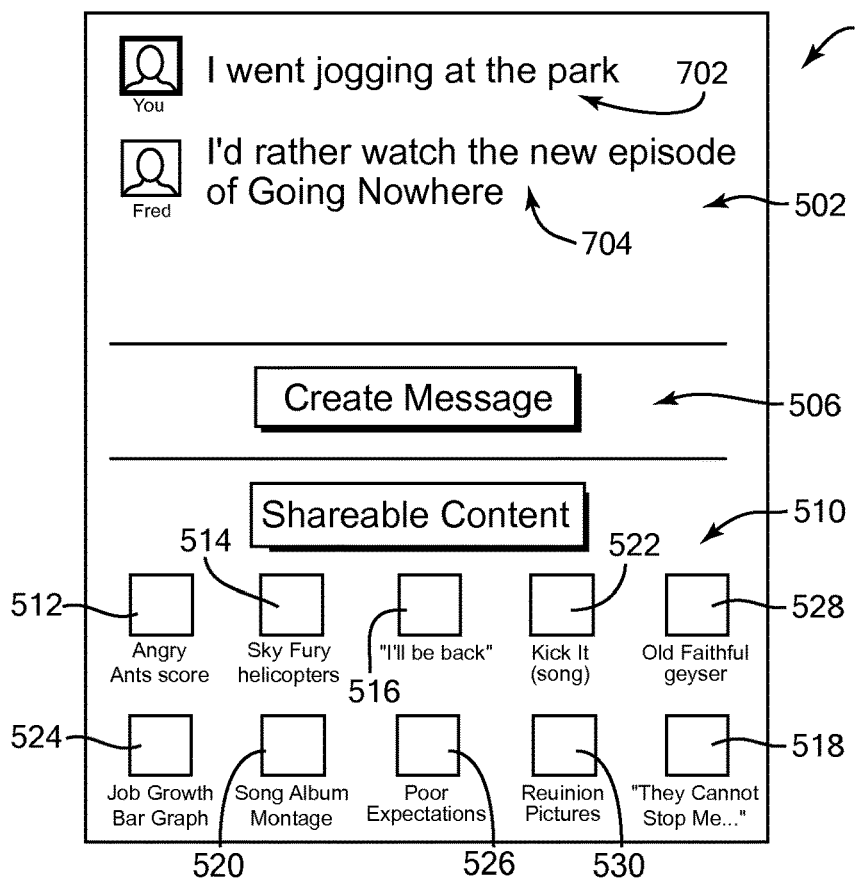

FIG. 7 illustrates another example of display screen 500 including one or more shareable content features described herein. For example, FIG. 7 illustrates the same real-time communication as shown in FIGS. 5 and 6 at a later point in the communication. At this point, the user and the other user have contributed the additional text lines 702 and 704. In some implementations, the device (e.g., a software application running on the device) can examine the contributions made by the users in the communication to determine whether additional or new content items should be displayed based on those contributions, as described above with reference to FIG. 4.

Figure 8:
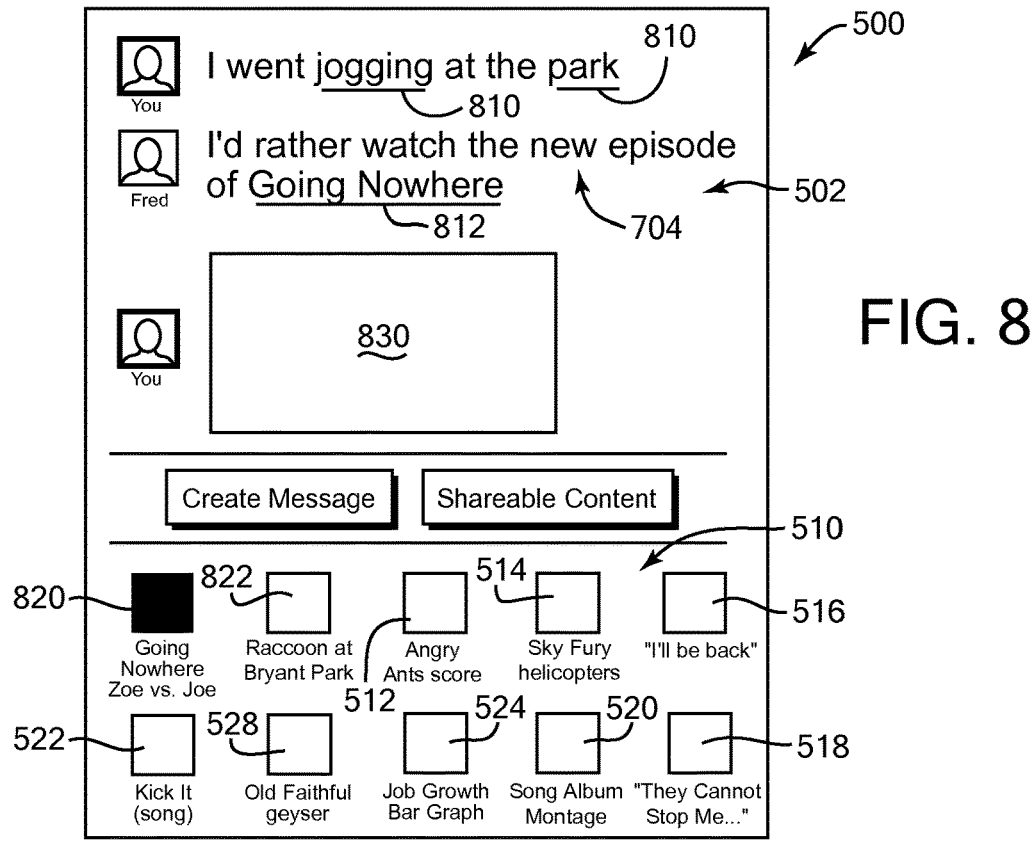

FIG. 8 illustrates a further development of the interface of display screen 500 shown in FIG. 7. The device has found search terms within the user contributions to the communication, including words 810 and a proper noun or title 812 (underlined in this example for clarity, but not underlined on the actual display). Based on these search terms, the device has obtained (e.g., found or created) two content items 820 and 822. Content item 820 was found by the device in a repository of content items created by other entities and having tags which can be searched. In this case, content item 820 was organized based on the title 812 of the television program which was referenced by the other user in text message 704. In other implementations, the device can access the referenced entire work (television episode) and create one or more content items by extracting frames of scenes of that video content. Content item 822 was found by the device by matching its tag or descriptor to one of the words 810, "park," as contributed by the user in the communication. For example, content item 822 can be a photo of a park scene taken by the user and a previous visit to the park. The content item 822 was already included in the pool of content items previously created by the device based on user activity, but was too low ranking on the list to be previously displayed in durable content area 510 on screen 500.

Since the users in the communication provided words matching the content items 820 and 822, these content items are raised in rank and displayed in the area 510 at the top of the list of content items. This displaces two content items that were previously displayed in area 510. In this example, content items 526 and 530 are removed from the screen 500 to make room for content items 820 and 822. The content item 518 was previously lower then these removed content items 526 and 530, but is not removed in this example because the user previously selected content item 518 in this communication (in FIG. 6), thus raising its rank over the ranks of content items 526 and 530. In various implementations, the content item 518 can be kept in the same location in the area 510 so as to not confuse the user, as shown in FIG. 8, or can be displayed in its newly-ranked position (if different).

In the example of FIG. 8, the user of the device selects a content item 820 in content area 510 as indicated by its highlighted icon. In response, the larger-sized transmitted content item 830 associated with the selected icon-sized content item 820 is displayed on the receiving user's device (not shown) and is also displayed in the messaging area 502, e.g., on a line of text. For example, content item 830 can be a video clip from the related television program. Alternatively, content item 830 can be displayed in other size, form, and/or location, e.g., in a predetermined area of a display screen, in a separate window, etc.

Figure 9:
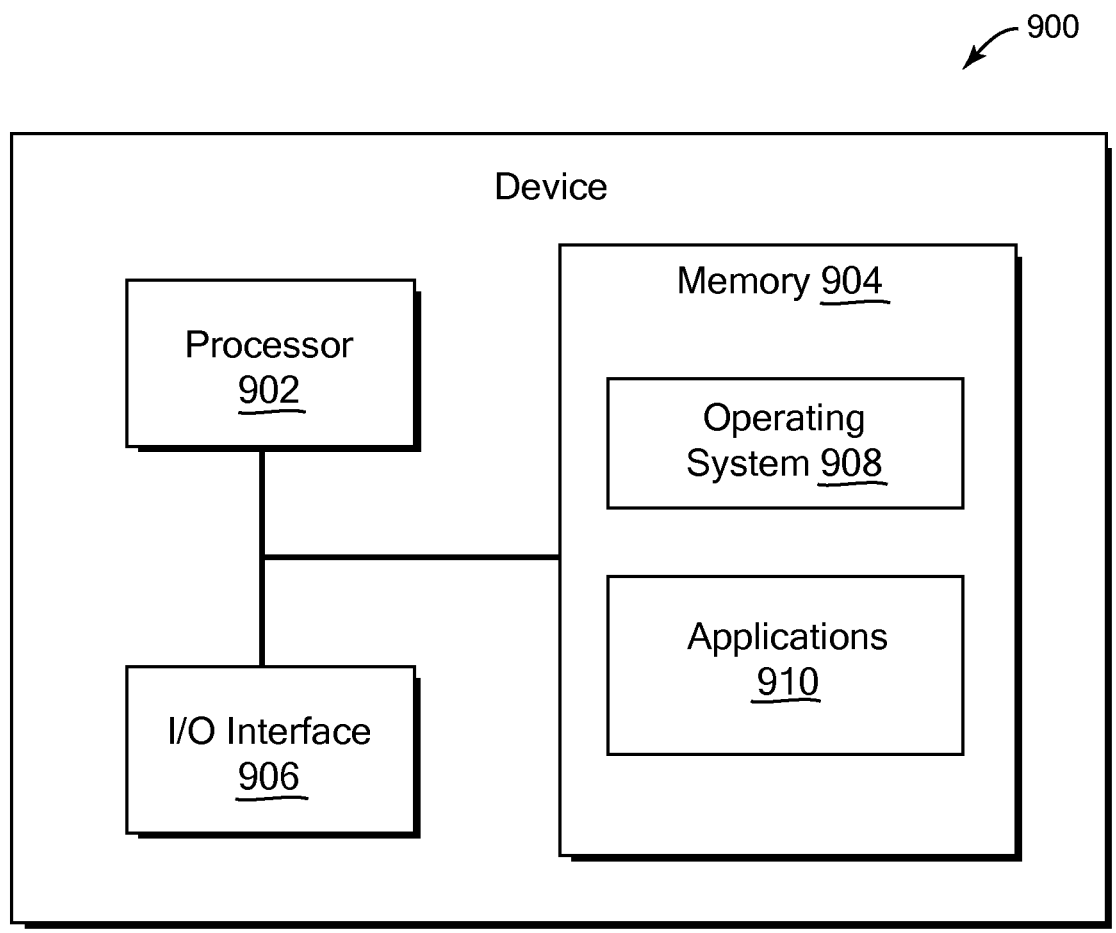
FIG. 9 is a block diagram of an example device which may be used for one or more implementations described herein.

FIG. 9 is a block diagram of an example device 900 which may be used to implement one or more features described herein. In one example, device 900 may be used to implement a client device 120, 122, 124, and/or 126 of FIG. 1, and perform appropriate method implementations described herein or portions thereof. Device 900 can be any suitable computer system, server, or other electronic or hardware device. For example, the device 900 can be a desktop computer, portable computer, or electronic device (portable device, cell phone, smart phone, tablet computer, television, TV set top box, personal digital assistant (PDA), media player, game device, etc.), mainframe computer, workstation, etc. In some implementations, device 900 includes a processor 902, a memory 904, and input/output (I/O) interface 906.

Processor 902 can be one or more processors or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the device 900 by the processor 902, including an operating system 908 and one or more applications engines 910 such as a media display engine, videoconferencing engine, communications engine, voice recognition engine, face or object recognition engine, etc. In some implementations, the applications engines 910 can include instructions that enable processor 902 to perform the functions described herein, e.g., some or all of the methods of FIGS. 2-4. Any of software in memory 904 can alternatively be stored on any other suitable storage location or computer-readable medium. In addition, memory 904 (and/or other connected storage device(s)) can store units of content, content items, content item sets and lists, and other data used in the features described herein. Memory 904 and any other type of storage (magnetic disk, optical disk, magnetic tape, or other tangible media) can be considered "storage devices."

I/O interface 906 can provide functions to enable interfacing the device 900 with other systems and devices. In some implementations, the I/O interface connects to interface components or devices (not shown) such as input devices, including one or more cameras and microphones, keypad or keyboard, pointing device, touchscreen, scanner, etc. The I/O interface also connects to output components or devices, including one or more display devices (e.g., such as an LCD, LED, or plasma display screen, CRT, television, monitor, touchscreen, 3-D display screen, or other visual display) and speaker devices, and in some implementations, additional devices (printer, motors, etc.). For example, network communication devices, storage devices such as memory and/or database 106, and input/output devices can also communicate via interface 606.

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While device 900 is described as performing steps as described in some implementations herein, any suitable component or combination of components of device 900 or similar system, or any suitable processor or processors associated with such a system, may perform the steps described.

A server device can also implement and/or be used with features described herein, such as server system 102 shown in FIG. 1. For example, a system implementing method 300 of FIG. 3 or other methods herein can be any suitable system implemented similarly as device 900. In some examples, the system can take the form of a mainframe computer, desktop computer, workstation, portable computer, or electronic device (portable device, cell phone, smart phone, tablet computer, television, TV set top box, personal digital assistant (PDA), media player, game device, etc.). Such a system can include some similar components as the device 900, such as processor(s) 902, memory 904, I/O interface 906, and applications engines 910. An operating system, software and applications/engines suitable for the system can be provided in memory and used by the processor, such as client group communication application software, media presentation software, graphics editing engine, web hosting engine, social networking engine, etc. The I/O interface for the system can be connected to network communication devices, as well as to input and output devices such as a microphone for capturing sound, a camera for capturing images or video, audio speaker devices for outputting sound, a display device for outputting images or video, or other output devices. A connected display device, for example, can be used to display visual output and controllable features as described herein, where such display device can include any suitable display similarly as described above. Some implementations can provide an audio output device, such as voice output or synthesis that speaks text and/or describes preferences.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., images depicting the user, information about a user's social network, user characteristics (age, gender, profession, etc.), social actions, activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or blocks shown as sequential in this specification may be performed at the same time.

What is claimed is:

1. A method comprising:
generating, by a content capturing device, a particular image and image metadata associated with the image, the image metadata indicating a particular geographic area that is associated with the particular image;
determining, by the content capturing device, a score for the particular image based at least on a length of time that the content capturing device was indicated as being physically present in the particular geographic area that is indicated in the image metadata as being associated with the particular content item;
at a later time, when a real-time communication session is occurring using the content capturing device and while the content capturing device is physically present in the particular geographic area, determining that the score for the particular image that was determined based at least the length of time that the content capturing device was indicated as being physically present in the particular geographic area satisfies a threshold; and
in response to determining that the score for the image that was determined based at least on the length of time that the content capturing device was indicated as being physically present in the particular geographic area satisfies the threshold, causing a presentation of the particular content item by the content capturing device on a real-time communication interface that is associated with the real-time communication session, for selection by a user of the content capturing device.

2. The method of claim 1, comprising:
receiving data indicating a selection of the particular image, then transmitting the particular image item to another device.

3. The method of claim 1, wherein generating the particular image comprises excerpting a portion of stored content data.

4. The method of claim 1, wherein the particular image is generated from content that is received during a different, recently-initiated communication.

5. The method of claim 1, wherein the particular image is selected, among a set of different content items, for presentation based on the respective scores for the content items.

6. The method of claim 1, comprising determining a quantity of images that were captured by the content capturing device in the geographic area.

7. The method of claim 1, comprising determining an amount of motion sensed by the content capturing device in the geographic device.

8. A non-transitory computer-readable medium storing software comprising instructions executable by one or more computers which, upon such execution, cause the one or more computers to perform operations comprising:
- generating, by a content capturing device, a particular image and image metadata associated with the image, the image metadata indicating a particular geographic area that is associated with the particular image;
- determining, by the content capturing device, a score for the particular image based at least on a length of time that the content capturing device was indicated as being physically present in the particular geographic area that is indicated in the image metadata as being associated with the particular content item;
- at a later time, when a real-time communication session is occurring using the content capturing device and while the content capturing device is physically present in the particular geographic area, determining that the score for the particular image that was determined based at least the length of time that the content capturing device was indicated as being physically present in the particular geographic area satisfies a threshold; and
- in response to determining that the score for the image that was determined based at least on the length of time that the content capturing device was indicated as being physically present in the particular geographic area satisfies the threshold, causing a presentation of the particular content item by the content capturing device on a real-time communication interface that is associated with the real-time communication session, for selection by a user of the content capturing device.

9. The medium of claim 8, wherein the operations comprise:
- receiving data indicating a selection of the particular image, then transmitting the particular content item to another device.

10. The medium of claim 8, wherein generating the particular image comprises excerpting a portion of stored content data.

11. The medium of claim 8, wherein the particular image is generated from content that is received during a different, recently-initiated communication.

12. The medium of claim 8, wherein the particular image is selected, among a set of different content items, for presentation based on the respective scores for the content items.

13. The medium of claim 8, wherein the operations comprise determining a quantity of images that were captured by the content capturing device in the geographic area.

14. The medium of claim 8, wherein the operations comprise determining an amount of motion sensed by the content capturing device in the geographic device.

15. A content capturing device comprising one or more computers and one or more storage devices storing instructions that are operable, when executed by the one or more computers, to cause the one or more computers to perform operations comprising:
- generating, by a content capturing device, a particular image and image metadata associated with the image, the image metadata indicating a particular geographic area that is associated with the particular image;
- determining, by the content capturing device, a score for the particular image based at least on a length of time that the content capturing device was indicated as being physically present in the particular geographic area that is indicated in the image metadata as being associated with the particular content item;
- at a later time, when a real-time communication session is occurring using the content capturing device and while the content capturing device is physically present in the particular geographic area, determining that the score for the particular image that was determined based at least the length of time that the content capturing device was indicated as being physically present in the particular geographic area satisfies a threshold; and
- in response to determining that the score for the image that was determined based at least on the length of time that the content capturing device was indicated as being physically present in the particular geographic area satisfies the threshold, causing a presentation of the particular content item by the content capturing device on a real-time communication interface that is associated with the real-time communication session, for selection by a user of the content capturing device.

16. The device of claim 15, wherein the operations comprise:
- receiving data indicating a selection of the particular image, then transmitting the particular content item to another device.

17. The device of claim 15, wherein generating the particular image comprises excerpting a portion of stored content data.

18. The device of claim 15, wherein the particular image is generated from content that is received during a different, recently-initiated communication.

19. The device of claim 15, wherein the particular image is selected, among a set of different content items, for presentation based on the respective scores for the content items.

20. The device of claim 15, wherein the operations comprise determining a quantity of images that were captured by the content capturing device in the geographic area.

* * * * *